(12) United States Patent
Legay et al.

(10) Patent No.: US 9,292,538 B2
(45) Date of Patent: Mar. 22, 2016

(54) SYSTEM AND METHOD FOR IMPROVED DATA ACCESSIBILITY

(71) Applicants: Stephane G. Legay, Scottsdale, AZ (US); Scott L. Mitchell, Scottsdale, AZ (US)

(72) Inventors: Stephane G. Legay, Scottsdale, AZ (US); Scott L. Mitchell, Scottsdale, AZ (US)

(*) Notice: Subject to any disclaimer, the term of this patent is extended or adjusted under 35 U.S.C. 154(b) by 232 days.

(21) Appl. No.: 13/842,089

(22) Filed: Mar. 15, 2013

(65) Prior Publication Data

US 2014/0280400 A1 Sep. 18, 2014

(51) Int. Cl.
*G06F 17/30* (2006.01)
*H04N 21/231* (2011.01)

(52) U.S. Cl.
CPC ........ *G06F 17/30194* (2013.01); *H04N 21/231* (2013.01)

(58) Field of Classification Search
None
See application file for complete search history.

(56) References Cited

U.S. PATENT DOCUMENTS

| 2007/0189708 A1* | 8/2007 | Lerman et al. ................. 386/52 |
| 2014/0003799 A1* | 1/2014 | Soroushian et al. .......... 386/353 |
| 2014/0189046 A1* | 7/2014 | Vezzuto et al. ............... 709/217 |

* cited by examiner

*Primary Examiner* — Belix M Ortiz Ditren
(74) *Attorney, Agent, or Firm* — Wright Law Group, PLLC; Mark F. Wright (57) ABSTRACT

A system is configured to allow for near simultaneous data capture, encoding, and uploading of the resultant data file containing the captured data. By operating in a substantially parallel fashion, the separate processes of capturing, encoding, and uploading one or more data files created from a data source can be completed much more quickly and efficiently, thereby making the resultant data file available to the content consumer in an overall shorter period of time than presently possible using conventional sequential data file creation techniques. The method also includes the reorganization of standard data files as part of the process to more quickly and efficiently create the data file for distribution and ultimate consumption by the content consumer user.

14 Claims, 5 Drawing Sheets

SYSTEM AND METHOD FOR IMPROVED DATA ACCESSIBILITY

RELATED APPLICATION

This application claims the benefit of U.S. Provisional Patent Application No. 61/611,545, which application was filed on Mar. 15, 2012, and which application is incorporated herein by reference.

BACKGROUND OF THE INVENTION

1. Technical Field

The present invention relates generally to the field of data transfer and more specifically relates to systems and methods for more rapidly and efficiently creating and disseminating data streams to content consumers.

2. Background Art

Over the years, the Internet has provided users with increased access for various forms of data and media, including movies, music, live event feeds and other forms of audio/video streams, etc. Additionally, the continued emergence of "cloud computing" has positioned the Internet as a location for storage of various types of data files, providing easy access for sharing data files. Various Internet sites and service providers are now providing access to various forms and types of data to millions of people every day. Further, the amount and types of data now being routinely transferred via the Internet continues to grow at a rapid pace.

Depending on the type of data being transferred, its intended use and audience, as well as the size of the data file, there are a number of ways in which a given data file may be stored, transmitted, and accessed. Internet streaming is a popular option for providing users access to media related data files such as movies, TV shows, music files, etc. The selection of the appropriate storage and transmission methods and equipment is important to ensure that the user experience is successful for the intended audience.

While the delivery and provision of data streams and associated content is increasingly popular, there are some difficulties in the efficient delivery of the content to the intended consumers of the content. For example, "streaming" and "live streaming" are very popular methods that may be used to deliver audio/video content to the content consumer. However, when watching a streaming video signal, it is not uncommon to experience delays in the stream, which can reduce the enjoyment of watching and listening to the audio/video content. The delays may be caused by many different factors, but are often related to bandwidth.

Another issue facing content providers is the requirement to prepare a data stream for transmission via the Internet. In general, prior to transmission, the data stream may be encoded and/or compressed to increase the efficiency of the data transmission. However, there is a temporal element associated with the conversion of the data stream from its original format to a format that is suitable for transmission via the Internet. For example, H.264 is one well-known standard for transmission of audio/video data streams (e.g., TV shows, movies, sporting events, etc.). The amount of time that it takes to encode a data stream into an H.264 data file for transmission via the Internet is roughly equivalent to the length of the event. So, for an hour-long event, it can take approximately one hour to encode the corresponding data file.

Once the H.264 file has been encoded, it may be uploaded to a hosting location where the content consumers can access the data file. It should be noted that, depending on bandwidth, the uploading and downloading process associated with delivering the data file to the consumer can introduce additional time delays into the process, further delaying the availability of the data file for use by the content consumer.

Given the current state of the art, as discussed herein, there are two typical content capture and distribution models that are in widespread use and that present a continuum of benefits and limitations. One model contemplates a local content preparation process that is completed prior to any upload or distribution and the second model contemplates a live streaming model, where the content is captured, encoded and uploaded for consumption in "real time" and made available as the content is created.

In the first model, using a weekly television series as an example, the entire program is captured and recorded locally, encoded to the proper format, and then uploaded to the Internet for consumption by the content consumer. Once the program has been uploaded, this model reduces the issues surrounding limited bandwidth on the uploading side but does nothing to diminish the bandwidth issues on the download side when the content is accessed by the content consumer. The delivery of the content to the content consumer will be limited by the download bandwidth of the content consumer's Internet connection.

Additionally, this model guarantees a somewhat delayed distribution of the content because the entire program must be captured and encoded prior to being uploaded and made available. This model is not generally suitable for live events because the encoding process does not begin until all of the content has been captured. With the content captured, the file index and related playback instructions can be created and embedded as part of the content file. After encoding, the encoded content must be uploaded prior to being made available to the content consumer. The sequential nature of these steps means that there can be a significant delay before the content is made available to the content consumer.

In order to avoid some of the drawbacks of the first model, live streaming has been developed. In this model, the content is continuously uploaded and delivered to the content consumer in as close to "real time" as possible so that the immediacy of the event can be preserved. This is the model that is used for streaming live events over the Internet. While this model may provide more immediate access to the content, it introduces the probability of bandwidth-induced delays on both the upload side of the equation and the download side of the equation. To deal with the probability of "hiccups" in the streaming of the content on one end or the other, it is customary to purposefully "downgrade" the quality of the content to reduce the amount of data being streamed over the Internet. This provides for a smoother and more rapid data transfer but also results in lower quality content, particularly for video streams. Once again, the tradeoffs have to be considered in selecting the proper approach for each application.

The various drawbacks associated with the current content delivery methods have led to some undesirable results in the smooth and efficient distribution of data streams to content consumers. Accordingly, without improvements in the current systems, procedures, and methods for creating, encoding, and distributing data streams the overall process and content consumer experience will continue to be sub-optimal.

BRIEF SUMMARY OF THE INVENTION

A system is configured to allow for near simultaneous data capture, encoding, and uploading of the resultant data file containing the captured data. By operating in a substantially parallel fashion, the separate processes of capturing, encoding, and uploading one or more data files created from a data source can be completed much more quickly and efficiently, thereby making the resultant data file available to the content consumer in an overall shorter period of time than presently possible using conventional sequential data file creation techniques. The method also includes the reorganization of standard data files as part of the process to more quickly and efficiently create the data files for distribution and ultimate consumption by the content consumer user.

BRIEF DESCRIPTION OF THE FIGURES

The preferred embodiments of the present invention will hereinafter be described in conjunction with the appended drawings, wherein like designations denote like elements, and.

DETAILED DESCRIPTION OF THE INVENTION

A system is configured to allow for near simultaneous data capture, encoding, and uploading of the resultant data file containing the captured data. By operating in a substantially parallel fashion, the separate processes of capturing, encoding, and uploading one or more data files created from a data source can be completed much more quickly and efficiently, thereby making the resultant data file available in an overall shorter period of time than presently possible using conventional sequential data file creation techniques. The method also includes the reorganization of standard data files as part of the process to more quickly and efficiently create data files for distribution and ultimate consumption by the content consumer.

For purposes of this disclosure, it should be noted the "data file" is a broad description for any type of digital data that may be transmitted from one location to another. This definition includes files containing audio, video, numeric information, static data, and any other type of data known to those skilled in the art. Accordingly, no type of digital data is excluded from the definition of "data file."

Aspects of the system are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In this fashion, the appropriate entities (i.e., producers, distributors, vendors, content brokers, etc.) can utilize the program product to initiate and complete a wide variety of tasks for the purposes of creating and disseminating of data files. Similarly, a program product in accordance with one or more preferred embodiments of the present invention can also be configured to perform substantially all of the steps depicted and described in conjunction with the figures below for creating and disseminating data files in accordance with a preferred exemplary embodiment of the present invention system as described herein.

While the present invention will be described in detail by using various examples of a typical data files used in audio/video applications, those skilled in the art will recognize that the equipment, processes, methods and techniques described herein have broad applicability multiple applications where quick and efficient creation and dissemination of data files is desirable.

Figure 1:
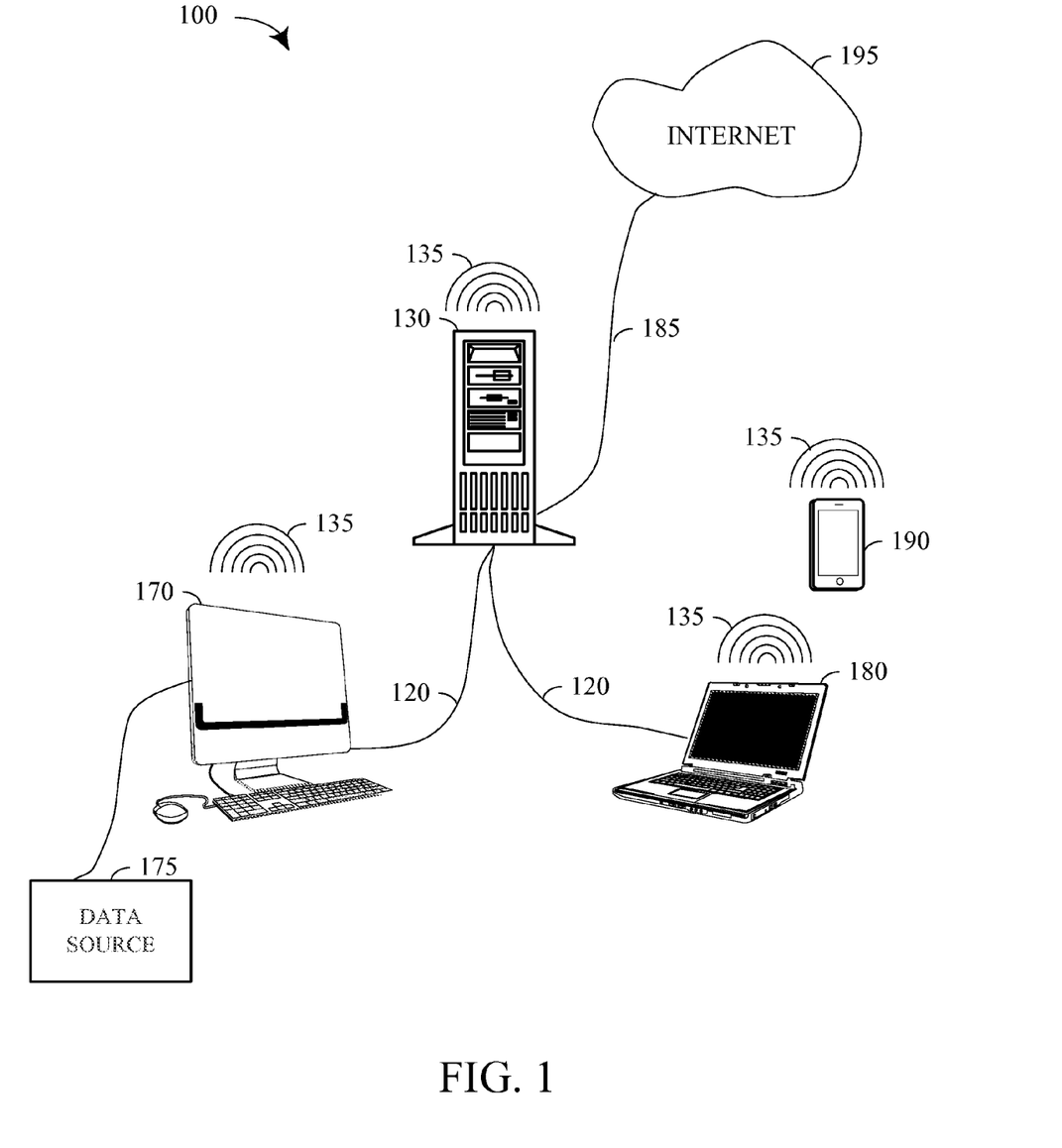
FIG. 1 is a perspective view of a computer system for creating and distributing data files in accordance with a preferred exemplary embodiment of the present invention.

Referring now to FIG. 1, a computer system 100 for creating and disseminating data files in accordance with a preferred exemplary embodiment of the present invention comprises: a data server 130; at least one of a desktop computer 170 and a laptop computer 180; one or more data sources 175, and a smartphone or Personal Digital Assistant 190 all connected or coupled via a local area network 120 to the Internet 195 via a wireless connection 135, a wired connection 185 or both.

Taken together, the components of computer system 100 provide a platform for creating and disseminating data files for consumption over a computer network such as the Internet. Computer system 100 provides a mechanism for users to efficiently and effectively create, store, and disseminate data files as well as provide information for making decisions and taking actions based upon the patterns and content of the data flow, including responses from content consumers and content suppliers.

In the most preferred embodiments of the present invention, computer system 100 is configured as a system that will be used to create and disseminate data files for media consumption by content consumers. In this type of environment, the group of users for computer system 100 will typically include both producers of audio/video content and consumers seeking to consume the audio/video content. However, it should be noted that the various preferred embodiments of the present invention are suitable for deployment in a wide variety of environments, wherever and whenever it is desirable to have greater control and operational efficiency for creating and disseminating data files as described herein.

Network 120 represents any suitable computer communication link or similar communication mechanism, including some combination of a hardwired connection, an internal or external bus, a connection for telephone access via a modem, standard co-axial cable lines, high-speed T1 line, radio, infrared or other wireless communication methodologies (i.e. "Bluetooth," infrared (IR), etc.), private or proprietary local area networks (LANs) and wide area networks (WANs), as well as standard computer network communications over Internet 195 or an internal network (e.g. "intranet") via a wired or wireless connection, or any other suitable connection between computers and computer components known to those skilled in the art, whether currently known or developed in the future. It should be noted that portions of network 120 might suitably include a dial-up phone connection, a broadcast cable transmission line, a Digital Subscriber Line (DSL), an ISDN line, or similar public utility-like access link.

In the most preferred embodiments of the present invention, at least a portion of network 120 comprises a standard wired Internet connection 185 between the various components of computer system 100 for providing access to additional network resources and other remote locations. Network 120 provides for communication between the various components of computer system 100 and allows for relevant information to be transmitted from device to device. In this fashion, a user of computer system 100 can quickly and easily gain access to the relevant data and information utilized to search, retrieve, and display information from one or more databases as described in conjunction with the preferred embodiments of the present invention.

In the most preferred embodiments of the present invention, network 120 is configured to provide relatively high-speed transmission of both audio and video data and signals and comprises at least an Internet connection 185 for transmission of data captured by one or more computers 170 or 180.

In addition to the other components shown in FIG. 1, a wireless communication access device may be communicatively coupled to network 120 and may be type any wireless communication mechanism that is capable of generating a wireless communication signal 135 that is known to those skilled in the art to provide for wireless communication between network 120 and the various devices associated with network 120, including desktop computer 170, laptop computer 180 as well as smart phone 190. The most preferred embodiments of an acceptable wireless communication access device might comprise any type of wireless bridge, wireless router, or similar type of device (not shown this FIG.).

Regardless of the specific components, physical nature, and topology, network 120 serves to logically and communicatively link the physical components of computer system 100, thereby enabling stable and consistent communication between the components. This is especially important because in many preferred embodiments of the present invention, data server 130, desktop computer 170, and laptop computer 180 may be geographically remote and/or physically separated from each other.

Data server 130 represents a relatively powerful computer system that is made available to desktop computer 170, laptop computer 180, and/or phone 190 via network 120. Various hardware components (not shown this FIG.) such as external monitors, keyboards, mice, tablets, hard disk drives, recordable CD-ROM/DVD drives, jukeboxes, fax servers, magnetic tapes, and other devices known to those skilled in the art may be used in conjunction with data server 130. Data server 130 may also provide various additional software components (not shown this FIG. 1) such as database servers, web servers, firewalls, security software, and the like. The use of these various hardware and software components is well known to those skilled in the art. In at least one preferred embodiment of the present invention, data server 130 is deployed in a hosted environment and used to offer a "cloud computing" or Software as a Service (SAAS) product/service where end users can access the features of system 100 via the Internet.

Given the relative advances in the state-of-the-art computer systems available today, it is anticipated that the functions of data server 130 may be provided by many standard and readily available data servers. This may also include the deployment of multiple interconnected and redundant data servers 130 to enhance the availability and reliability of the functions provided by data server 130. Depending on the desired size and relative power required for data server 130, storage area network (SAN) technology may also be deployed in certain preferred embodiments of the present invention. Additionally, various biometric and identification verification devices for identifying users and controlling access as well as creating and verifying digital signatures (i.e., electronic signature processing) may also be included.

Desktop computer 170 may be any type of computer system known to those skilled in the art that is capable of being configured for use with computer system 100 as described herein. It should be noted that no specific operating system or hardware platform is excluded and it is anticipated that many different hardware and software platforms may be configured to create computer 170. As previously explained in conjunction with data server 130, various hardware components and software components (not shown this FIG.) known to those skilled in the art may be used in conjunction with computer 170. It should be noted that in the most preferred embodiments of the present invention, desktop computer 170 is linked (via wired or wireless connection) to its own LAN or WAN and has access to one or more additional data servers (not shown this FIG.).

In the most preferred embodiments of the present invention, desktop computer 170 will retrieve or capture a data file, divide the date file into "chunks" or segments and prepare the segments to be transferred to data server 130. The process whereby this is accomplished is set forth in method 300 of FIG. 3 below. It is important to note that the size of the segments may be larger or smaller, depending on the specific implementation or application and type of data being processed. In some applications, it may be advantageous to have smaller data segments and in other applications it may be advantageous to have relatively larger data segments for processing.

Data source 175 represents any type of data source, including static data files or dynamic data files captured or created by hardware and software combinations that may be used to generate data files for distribution and sharing. Data capture device 175 may be a static data file, streaming data captured from a camera or camcorder, digital video capture card, etc. While shown as being connected to computer 170, data source 175 may, in certain applications, be contained within computer 170 (e.g., an internal data capture card). Accordingly, any device that is capable of storing and/or capturing data and that can be connected to or coupled to computer 170 may be considered as a data source 175 and the resulting treatment of the data file can be conducted as set forth herein.

Similarly to desktop computer 170, laptop computer 180 may be any type of relatively lightweight portable computer system known to those skilled in the art that is capable of being configured for use with computer system 100 as described herein. This includes netbooks, tablet computers (e.g., iPad®), pen-based computers and the like. Computer 180 may also be configured to allow the transmission and reception of audio signals, messages, and alerts via server 130 and network 120.

Additionally, netbooks, handheld and palmtop devices are also specifically included within the description of devices that may be deployed as a laptop computer 180. It should be noted that no specific operating system or hardware platform is excluded and it is anticipated that many different hardware and software platforms may be configured to create laptop computer 180. As previously explained in conjunction with data server 130, various hardware and software components (not shown this FIG.) known to those skilled in the art may be used in conjunction with laptop computer 180. It should also be noted that in the most preferred embodiments of the present invention, laptop computer 180 is linked to its own LAN or WAN and has access to its own data server (not shown this FIG.).

It should be noted that while FIG. 1 shows only a single desktop computer 170 and a single laptop computer 180, it is anticipated that the most preferred embodiments of the present invention will comprise dozens or even hundreds of computers 170 and laptop computers 180. Each of these computers 170 and 180 will be configured to access data server 130 in an appropriately secure way so as to accomplish the specific objectives of the user of the desktop computer 170 or laptop computer 180.

For example, once a data file has been captured and stored on data server 130, consumers may utilize one or more desktop computers 170 or laptop computers 180 to access data server 130 and, in turn, access the data files stored on data server 130. This would allow the content consumer to view and listen to the audio and video content contained in the data files. An operator, located in a remote location, may use a desktop computer 170 or laptop computer 180 to access data server 130 to retrieve information about the persons and data files being created, stored, and viewed by the users of computer system 100.

In the most preferred embodiments of the present invention, multiple desktop computers 170 and multiple laptop computers 180 will all be configured to communicate simultaneously with data server 130 and with each other via network 120. In addition, the most preferred embodiments of the present invention include an Application Service Provider (ASP) environment where data server 130 may be operated as a clearinghouse in a hosted operation. In this fashion, multiple desktop computers 170 and laptop computers 180 will have access to data server 130 and the databases stored thereon via a global computer network such as Internet 195. Data server 130 is further described below in conjunction with FIG. 2 below. Additionally, desktop computers 170 and laptop computers 180 may be used to access and view the data files that have been created and stored on data server 130.

An optional printer and an optional fax machine (not shown this FIG.) may also be deployed for various hard copy data output requirements (e.g., system performance reports, etc.) and may be considered to be any standard peripheral devices used for transmitting or outputting paper-based documents, notes, transaction details, reports, etc. in conjunction with the data files created and processed by computer system 100 (e.g., reports, statistical analyses, automated messages, etc.) Finally, it should be noted that the optional printer and the optional fax machine are merely representative of the many types of peripherals that may be utilized in conjunction with computer system 100. It is anticipated that other similar peripheral devices will be deployed in the various preferred embodiment of the present invention and no such device is excluded by its omission in FIG. 1.

Smartphone 190 is representative of any type of cellular device or telephone that may be communicatively coupled to computer system 100. This includes, for example, personal digital assistants ("PDAs"), Windows® mobile phone devices, Android® or Palm® OS devices, Pocket PC® devices, the Apple® iPhone® and other various types of smartphones. Those skilled in the art will recognize these various devices and others that are suitable for deployment as phone 190. While somewhat less powerful than computers 170 and 180, smartphone 190 may also be configured to wirelessly communicate with data server 130 via a wireless connection 135 to network 120 to send and retrieve information to and from data server 130. Smartphone 190 may be used to access and view the data files stored on data server 130.

Given the standard functionality for devices that may be deployed as phone 190, this communication be provided by a wireless Internet connection (e.g. "wi-fi" or "wi-max") or a Bluetooth® connection. One example of the use for smartphone or PDA 190 in the context of computer system 100 would to send messages or alerts to a consumer regarding the status or availability of a desired data file for viewing purposes.

Those skilled in the art will recognize that FIG. 1 depicts a fairly standard "client/server" type communication arrangement where data server 130 is considered to be a server and computers 170 and 180 are considered to be clients of data server 130. Additionally, those skilled in the art will recognize that the functionality of data server 130 may be deployed on either of computers systems 170 and 180 in a more traditional "stand-alone" environment. In either case, the methods of the present invention are designed to minimize the amount of data that must be transferred from a database to the user of computer system 100.

Figure 2:
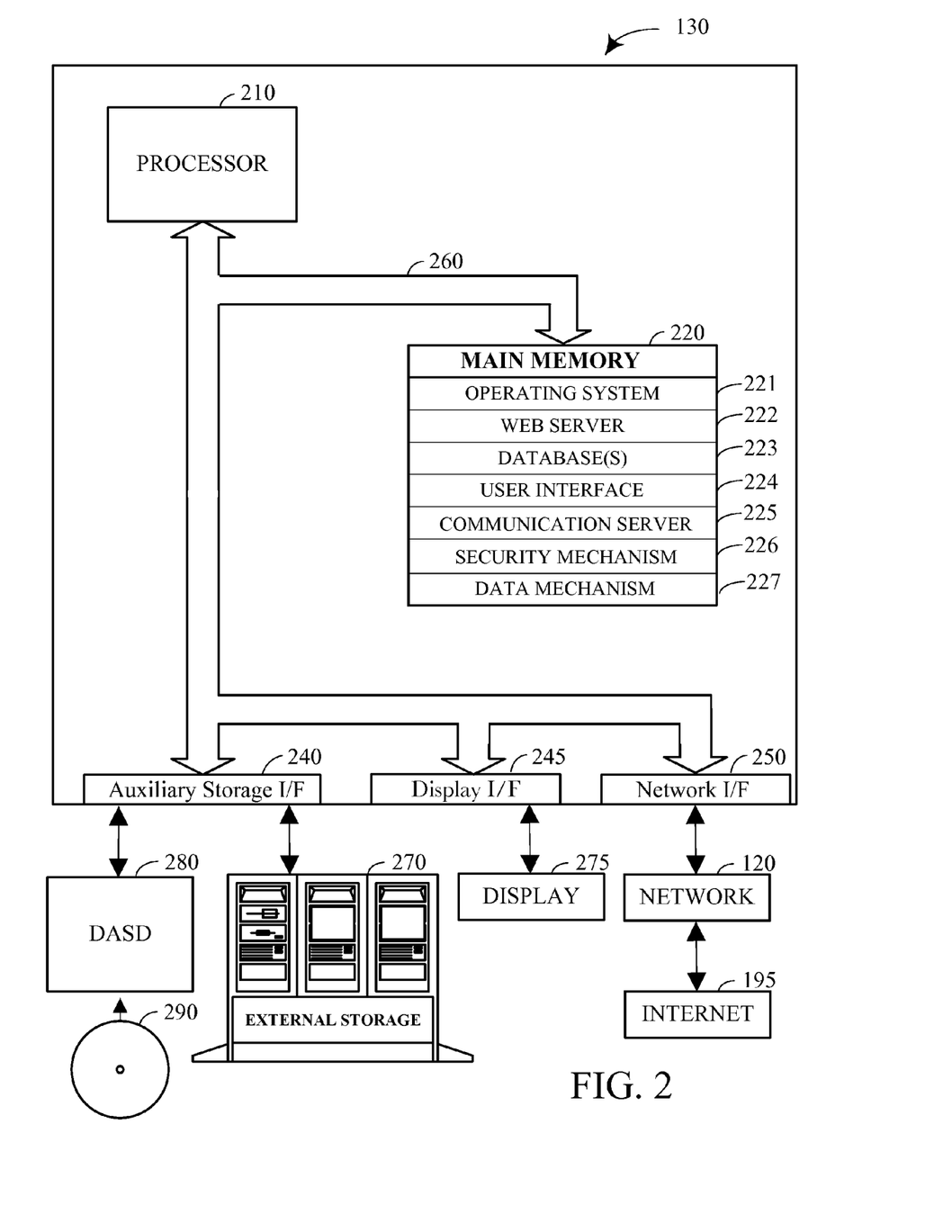
FIG. 2 is a block diagram of a server used for implementing a computer system for creating and distributing data files in accordance with a preferred exemplary embodiment of the present invention.

Referring now to FIG. 2, data server 130 of FIG. 1 in accordance with a preferred embodiment of the present invention represents one of many commercially available computer systems such as a Linux®-based computer system, an IBM® compatible computer system, or a Macintosh® computer system. However, those skilled in the art will appreciate that the methods and system of the present invention apply equally to any computer system, regardless of the specific operating system and regardless of whether the computer system is a more traditional "mainframe" computer, a complicated multi-user computing device or a single user device such as a personal computer or workstation.

Data server 130 suitably comprises at least one Central Processing Unit (CPU) or processor 210, an auxiliary storage interface 240, a display interface 245, and a network interface 250, all of which are interconnected via a system bus 260. Note that various modifications, additions, or deletions may be made to data server 130 illustrated in FIG. 2 within the scope of the present invention such as the addition of cache memory or other peripheral devices. FIG. 2 is not intended to be exhaustive, but is presented to simply illustrate some of the more salient features of data server 130.

Processor 210 performs computation and control functions of data server 130, and most preferably comprises a suitable central processing unit (CPU). Processor 210 may comprise a single integrated circuit, such as a microprocessor, or may comprise any suitable number of integrated circuit devices and/or circuit boards working in cooperation to accomplish the functions of a processor or CPU. Processor 210 is configured to execute one or more software programs contained within main memory 220. Although data server 130 depicted in FIG. 2 contains only a single main processor 210 and a single system bus 260, it should be understood that the present invention applies equally to computer systems having multiple processors and multiple system buses. Similarly, although the system bus 260 of the preferred embodiment is a typical hardwired, multi-drop bus, any connection means that supports bi-directional communication in a computer-related environment could be used.

Auxiliary storage interface 240 allows data server 130 to store and retrieve information from auxiliary storage devices, such as external storage mechanism 270, magnetic disk drives (e.g., hard disks or floppy diskettes) or optical storage devices (e.g., CD-ROM). One suitable storage device is a direct access storage device (DASD) 280. As shown in FIG. 2, DASD 280 may be a DVD or CD-ROM drive that may read programs and data from a DVD or CD disk 290.

Display interface 245 is used to directly connect one or more displays 275 to data server 130. Display 275, which may be non-intelligent (e.g., "dumb") terminals or fully programmable workstations, are used to provide system administrators and users the ability to communicate with data server 130. Note, however, that while display interface 245 is provided to support communication with one or more displays 275, computer data server 130 does not necessarily require a display 275, because all needed interaction with users and other processes may occur via network 120. Additionally, in certain preferred embodiments, data server 130 may have an integrated display 275.

Network interface 250 is used to connect data server 130 to network 120 and computer system 100, including computer 170 and computer 180 of FIG. 1. Network interface 250 broadly represents any suitable way to interconnect electronic devices, regardless of whether the network comprises present day analog and/or digital techniques or via some networking mechanism of the future. Network interface 250 preferably includes a combination of hardware and software that allows communications on network 120.

Software provided in conjunction network interface 250 preferably includes a communication manager that manages communication with other computer systems or other network devices via network 120 using a suitable network protocol. Many different network protocols can be used to implement a network. These protocols are specialized computer programs that allow computers to communicate across a network. TCP/IP (Transmission Control Protocol/Internet Protocol) is just one example of a suitable network protocol that may be used by the communication manager contained within network interface 250.

It is important to note that while the present invention has been (and will continue to be) described in the context of a fully functional computer system with certain application software, those skilled in the art will appreciate that the various software mechanisms of the present invention are capable of being distributed as a program product in conjunction with an article of manufacture comprising software stored on a computer readable storage medium in a variety of forms, and that the various preferred embodiments of the present invention applies equally regardless of the particular type or storage medium used to actually carry out the distribution. Examples of computer readable storage media include: recordable type media such as DVD and CD ROMS disks (e.g., disk 290), and transmission type media such as digital and analog communication links, including wireless communication links.

Main memory 220 suitably contains an operating system 221, a web server 222, one or more databases 223, a user interface 224, a communication server 225, a security mechanism 226, and a data mechanism 227. The term "memory" as used herein refers to any storage location in the virtual memory space of data server 130.

It should be understood that main memory 220 might not necessarily contain all parts of all components shown. For example, portions of operating system 221 may be loaded into an instruction cache (not shown) for processor 210 to execute, while other files may well be stored on magnetic or optical disk storage devices (not shown). In addition, although database 223 is shown to reside in the same memory location as operating system 221, it is to be understood that main memory 220 may consist of multiple disparate memory locations. It should also be noted that any and all of the individual software mechanisms or components shown in main memory 220 might be combined in various forms and distributed as a stand-alone program product. Finally, it should be noted that additional software components, not shown in this figure, might also be included.

Operating system 221 includes the software that is used to operate and control data server 130. In general, processor 210 typically executes operating system 221. Operating system 221 may be a single program or, alternatively, a collection of multiple programs that act in concert to perform the functions of an operating system. Any operating system now known to those skilled in the art or later developed may be considered for inclusion with the various preferred embodiments of the present invention.

Web server 222 may be any web server application currently known or later developed for communicating with web clients over a network such as the Internet. Examples of suitable web servers 222 include Apache web servers, Linux web servers, and the like. Additionally, other vendors have developed or will develop web servers that will be suitable for use with the various preferred embodiments of the present invention. Finally, while depicted as a single device, in certain preferred embodiments of the present invention web server 222 may be implemented as a cluster of multiple web servers, with separate and possibly redundant hardware and software systems. This configuration provides additional robustness for system uptime and reliability purposes. Regardless of the specific form of implementation, Web server 222 provides access, including a user interface, to allow individuals and entities to interact with graphical user interface 224, including via network 120 of FIG. 1.

Database 223 is representative of any suitable database known to those skilled in the art. In the most preferred embodiments of the present invention, database 223 is a Structured Query Language (SQL) compatible database file capable of storing information relative to various items that may be of interest to the users of computer system 100 of FIG. 1. In the most preferred embodiments of the present invention, database 223 will comprise a plurality of data files that have been created for use in conjunction with a preferred embodiment of computer system 100 of FIG. 1. For example, database 223 will most preferably contain audio and video content that may be accessed by consumers.

Graphical user interface 224 is a software component that provides the users of computer system 100 of FIG. 1 a means for interacting with the various components of computer system 100. In the most preferred embodiments of the present invention, graphical user interface 224 is a web browser based interface that is accessible to the users of computer system 100 via any standard web browser from any computer that is connected to the Internet. Alternatively, graphical user interface 224 may be implemented via a smart phone "app" accessible from smartphone 190. Additional details on graphical user interface 224 are presented below.

Those skilled in the art will recognize that other types of information for other types of data that may be used in other applications (e.g., historical, informational, technical, etc.) may be stored and retrieved as well. While database 223 is shown to be residing in main memory 220, it should be noted that database 223 might also be physically stored in a location other than main memory 220. For example, database 223 may be stored on external storage device 270 or DASD 280 and coupled to data server 130 via auxiliary storage I/F 240. Additionally, while shown as a single database 223, those skilled in the art will recognize the database 223 may actually comprise a series of related databases, logically linked together. Depending on the specific application and design parameters, database 223 may take many different forms when implemented.

The most preferred embodiments of computer system 100 of FIG. 1 will typically include a communication server 225 in main memory 220. Communication server 225 is an automated programmable system that is capable of generating one or more forms of messages or message events to the users of system 100. For example, communication server 225 may be configured to send automated email messages or SMS messages to cell phones. Communication server 225 may also be used to generate a hard copy or paper-based document (e.g., mail merge letters) using a printer that are then sent via standard U.S. Postal Service or some type of commercial message delivery company.

Additionally, communication server 225 may be configured to generate a facsimile message by utilizing fax server and a facsimile modem (not shown this FIG.) that is contained in data server 130 of FIG. 2. Communication server 225 is also capable of being configured and used to send and receive various electronic status messages (e.g. audio and video alerts) and updates to data server 130 and between computers 170, 180, and/or 190 of FIG. 1, as may be necessary to enhance the overall process of completing activities related to the creation and execution of arbitrated discount purchasing opportunities as described herein.

This includes the generation of automated email messages relating to the creation and availability of the data files, etc. Automated or on-demand e-mail messages may also be generated to provide notifications regarding data files as well as other information for related to the programs and consumers of the audio and video content stored in the data files in accordance with the various preferred embodiments of the present invention.

In addition, most preferred embodiments of the present invention might include a security and/or encryption mechanism 226 for verifying access to the data and information contained in and transmitted to and from data server 130. Security mechanism 226 may be incorporated into operating system 221 and/or web server 222. Additionally, security mechanism 226 may also provide encryption capabilities for other components of computer system 100 of FIG. 1, thereby enhancing the robustness of computer system 100 of FIG. 1. Security mechanism 226 is most preferably configured to protect the integrity and security of the information transmitted via network 120 of FIG. 1.

Data mechanism 227 is a software mechanism that is capable of interaction with the various components of computer system 100 of FIG. 1 to create, upload, store, and share or disseminate data files, including audio/video files, to users of computer system 100 of FIG. 1. Data mechanism 227 is the software mechanism that performs the functions described in conjunction with FIG. 4 below. Data mechanism 227 provides the functionality for reassembling the segments of the data file created by method 300 of FIG. 3 below. In at least some preferred embodiments of the present invention, a portion of data mechanism 227 may also be deployed on one or more of computers 170 and 180.

Further, depending on the type and quantity of information stored in database 223 and accessed by graphical user interface 224, security mechanism 226 may provide different levels of security and/or encryption for different computer systems 170 and 180 of FIG. 1 and the information stored in database 223. The level and type of security measures applied by security mechanism 226 may be determined by the identity of the end-user and/or the nature of a given request and/or response. In some preferred embodiments of the present invention, security mechanism 226 may be contained in or implemented in conjunction with certain hardware components (not shown this FIG.) such as hardware-based firewalls, switches, dongles, and the like.

In the most preferred embodiments of the present invention, the various components of computer system 100 of FIG. 1 are able to communicate using multiple communications protocols and systems (e.g., Voice over IP or "VoIP", Plain Old Telephone Service or "POTS", etc.). Those skilled in the art will recognize that the communication protocols used herein may be readily adapted and configured to allow for the rapid and efficient transmission and receipt of data by and between the various components of computer system 100 of FIG. 1. This would also include the ability to control and customize the input and output of computer system 100 of FIG. 1 for integration with other systems. While a specific exemplary embodiment of a suitable server 130 has been provided above, those skilled in the art will recognize that many other suitable computers (with more or fewer features) may be substituted for the specific example provided herein within departing from the spirit and scope of the present invention.

Figure 3:
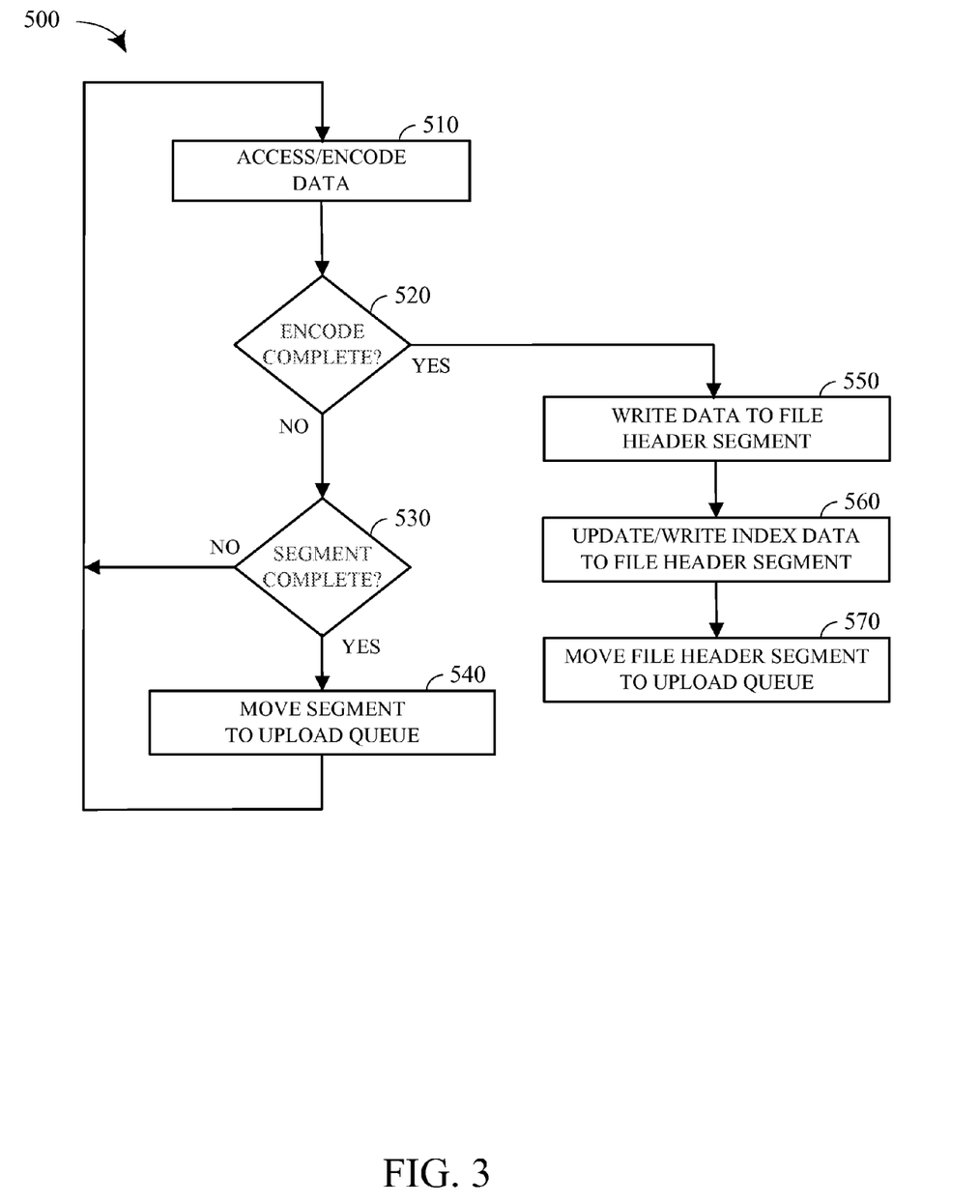
FIG. 3 is a method for preparing a data file for distribution over the Internet in accordance with a preferred exemplary embodiment of the present invention.

Referring now to FIG. 3, a method 300 for preparing a data file for sharing in accordance with a preferred exemplary embodiment of the present invention is depicted. As shown in FIG. 3, the data is accessed from a location, whether a static storage location, streaming data file, etc. and encoded in what is, essentially, a single step process (step 310). This process is accomplished by using a frame-by-frame capture approach and encoding process (using appropriate hardware and software configured for that purpose) and storing each portion or frame in the desired format (e.g., H.264) as it is captured.

It should be noted that, as the data are encoded, it will be packaged into segments of a previously determined size (e.g., 500K, 5 Mb, 10 Mb, etc.) in memory or on a local storage device as may be necessary or desired for a given application. The exact size of the segment is not as critical as noting that the each segment will be at least somewhat smaller in size than the total data file. The size of each segment will be determined based on the specific application and requirements for file storage, etc. and may be selected as desired or necessary to accomplish the purpose.

The system will continuously monitor the data access and encoding process as well as the creation of each segment and, as each segment is completed (step 330="YES") it will be assigned a unique reference ID that can be used to reconstruct the file at a later time and the completed segment will be uploaded to the upload queue for transmission to the file server (step 340). If more data is necessary to create a given segment (step 320="NO"), then the capture and encoding process will continue (step 310). This process will continue until all of the segments for the data file have been encoded and stored in the upload queue.

When the entire encoding process for the desired data file has been completed (step 320="YES") and all of the segments for the entire file have been created and loaded into the upload queue, it will be possible to determine the information that should be included in the header file segment and this information will be transferred to the header file (step 350) and the index data for the file will also be written to the header segment (step 360) and the header segment, which is the last segment to be transferred to the upload queue, will be moved to the upload queue (step 370). While the overall process of capturing and encoding data may not be significantly reduced by adopting this methodology, this methodology, when combined with the method of FIG. 5, allows for reducing the overall time required to make the data file available to the ultimate consumer.

Figure 4:
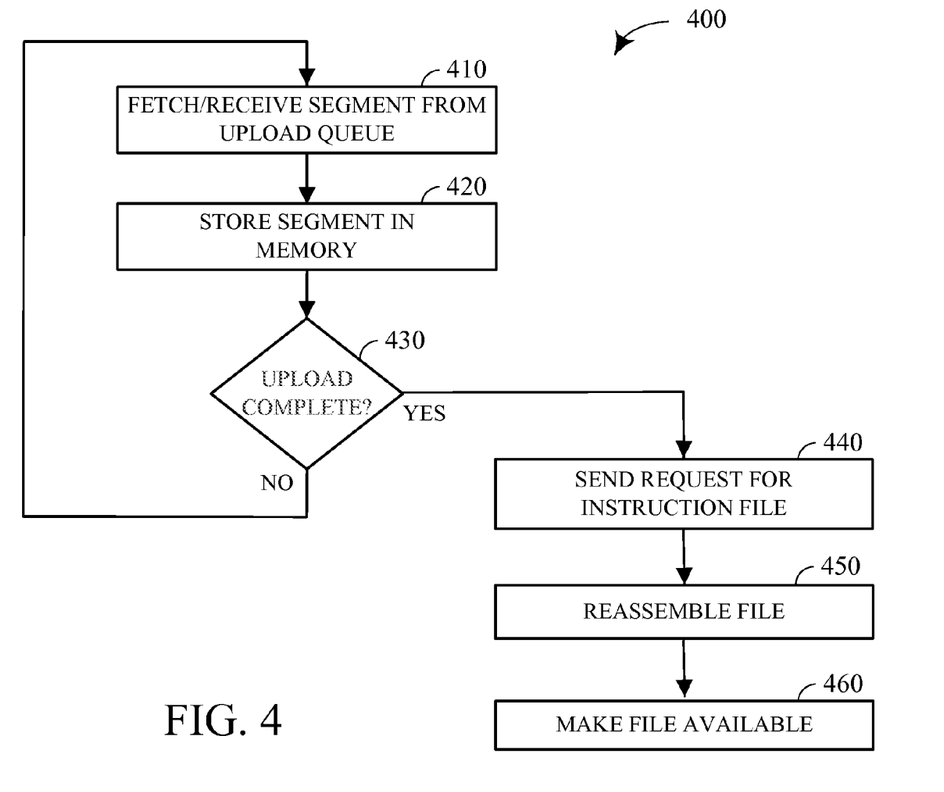
FIG. 4 is a method for creating a data file for distribution over the Internet in accordance with a preferred exemplary embodiment of the present invention.

Referring now to FIG. 4, a method 400 of reconstructing a transferred data file in accordance with a preferred exemplary embodiment of the present invention is depicted. As shown in FIG. 4, each segment that has been placed into the upload queue by method 300 of FIG. 3 will be fetched or received as it is made available (step 410) and stored in memory on the server (step 420) prior to distribution. As long as there are additional segments to be uploaded (step 430="NO"), the upload process will continue. Once all of the segments have been stored in memory on the distribution server (step 430="YES"), then the client pushes a message to the server signaling the end of the file upload process. The message contains the final segment sequencing information for the destination server (e.g., an instruction file that will identify each data segment and tell the destination server how the data segments should be arranged and ordered) (step 440). Once the combined index and header file has been received at the destination server, the destination server can rearrange the segments and reassemble the data file (step 450) and include a combined header and index file so that the resultant data file can be made available and accessed. The instruction file may be any type of file (e.g., XML, JSON, etc.) as may be desired or necessary for the specific application. It should be noted that after the completion of step 450 of FIG. 4, the resultant data file is a media file that can be made available using any standard access method suitable for the media file (step 460). It is important to note the "destination server" is a reference to any type of server or cluster of servers, including cloud servers made available via the Internet. The physical location and components used as the destination server is not limited in this regard.

It should also be noted that, in the most preferred embodiments of the present invention, method 300 of FIG. 3 and method 400 of FIG. 4 are implemented as substantially simultaneous operations that operate in a parallel fashion. This means that as soon as a data segment has captured, encoded, and been placed into the upload queue by method 300, it will be available for uploading to the server over the network (e.g., Internet) for later reconstruction and distribution while additional data segments are being captured and encoded. In practice, this allows for much faster reconstruction of the data file on the distribution server because as soon as the final segment is received, the file containing the combined index and header information can be uploaded and used to simply rearrange the previously received data segments into the appropriate sequence necessary for accessing and using the assembled media file. Similarly, multiple segments can be uploaded in parallel by opening multiple simultaneous data connections to the destination server. This is particularly useful when encoding a large, static file using a computer with a fast CPU (e.g., where encoding can be accomplished in 4× or 8× real time) and where there is a significant availability of upstream bandwidth. In this scenario, it is possible that the entire media file can be available for distribution from the destination server shortly after the final data segment has been captured and encoded.

It should also be noted that in multi-threaded operations, it is possible that each data segment may arrive out of sequence. However, since each data segment is identified by a unique identifier, the segments can be correctly identified and assembled by accessing the header and index information contained in the combined index and header segment. It is important to note that the last information uploaded, the header segment, is positioned at the head of the resultant file and the location of the previously uploaded segments is adjusted accordingly. This is important because the combined index and header segment will specify the location and order for the actual contents of the resultant file, providing for accurate playback.

Figure 5:
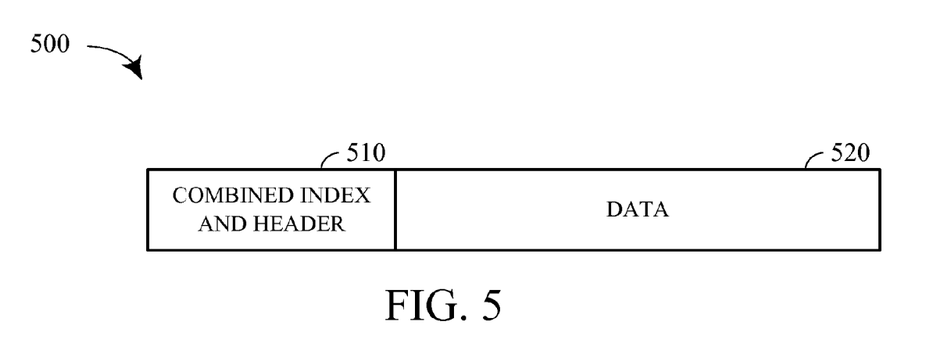
FIG. 5 is a data structure in accordance with a preferred exemplary embodiment of the present invention that is used to create a file that will be distributed over the Internet.

Referring now to FIG. 5, a data file 500, after being transferred and created by method 100 and method 300 of FIG. 3 depicted. As shown in FIG. 5, the combined header and index information is stored in segment 510 and the data is stored in segment 520. Using the present invention does not require the creation or adoption of any specialized hardware or software to utilize the files created by the methods and system described herein and the files will be compatible with any hardware/software combination that can access and utilize standard files formats such as H.264 as well as other industry standard formats and no format is excluded by its omission in this description.

Figure 6:
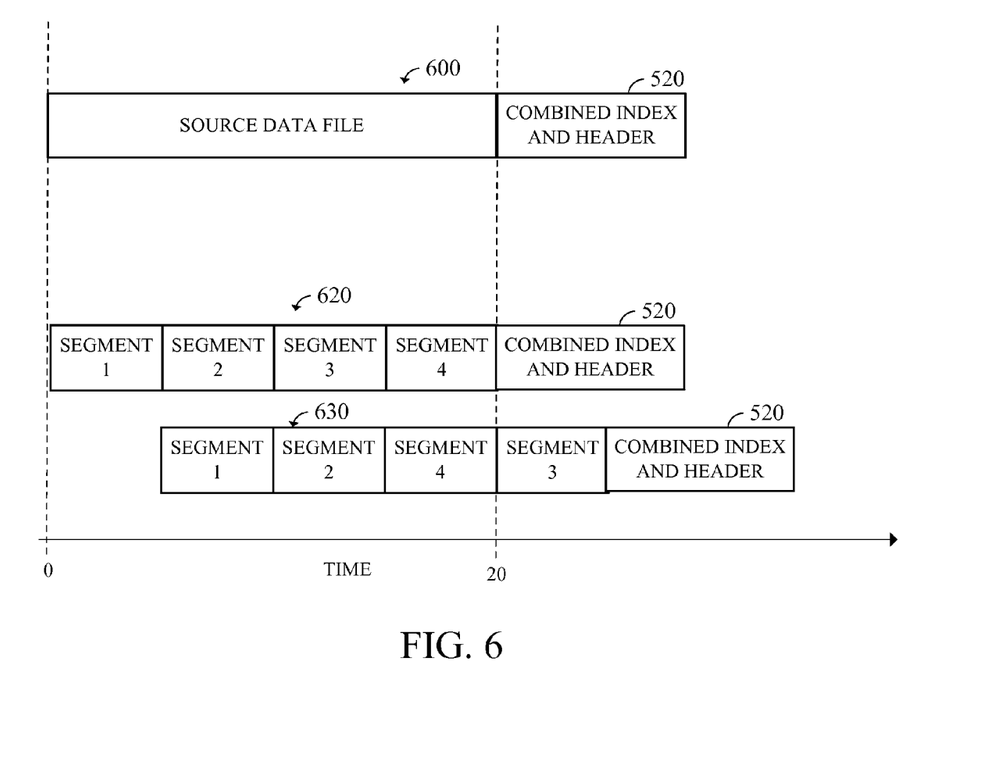
FIG. 6 is a series of processing queues for data file capture, encoding, and delivery used in accordance with a preferred exemplary embodiment of the present invention.

Referring now to FIG. 6, a series of queues used on conjunction with the methods of the present invention is depicted. As shown in FIG. 6, a source data file 600 is being created and processed for digital distribution. For purposes of this example, source data file 600 is considered to be a live audio-video signal that may be captured by any method known to those skilled in the art (e.g., digital camera, cell phone, etc.). At time "0" as shown on the timeline, the capturing of data stream 600 commences and, at time "20," the capture of source data file 600 will be completed.

Whenever a first pre-determined "chunk" or segment of source data 600 has been captured and encoded, it is designated as segment 1 and is loaded into upload queue 620 for transfer to the destination server. It is important to note that while segment 1 is being encoded, segment 2 is being captured. As soon as segment 1 has been uploaded, it is transferred and loaded into distribution queue 630 for final assembly, along with other uploaded segments and will be prepared for ultimate distribution via the Internet or some other means.

Similarly, after segment 1 has been captured, the next segment of source data file 600 can be captured and designated as segment 2. As it is captured, segment 2 is encoded and, once encoded, it is loaded into upload queue 620 for transfer to the destination server. While segment 2 is being encoded and transferred, segment 3 is simultaneously being captured from source data file 600. This process continues for all remaining segments, with many of the processing steps taking place in a parallel fashion. This parallel processing of capturing, encoding, and transmitting data segments substantially reduces the amount of time that it takes to get the encoded data file to the server when compared to the linear processes used in previously known methods.

As soon as segment 4 has been captured, it is encoded and transferred to distribution queue 630 for final assembly as well. After all 4 segments have been captured, an "end of file" signal is generated and the combined index and header information for all 4 segments can be created and encoded as combined index and header segment 520 and transmitted to distribution queue 630 where the 4 segments are combined with combined index and header file 520 and made ready for distribution to content consumers.

It should be noted that the various segments might not arrive at distribution queue 630 in the same order as they were initially created. Since the path traveled by each segment via the network may be different, it is possible that a segment that was encoded prior to a subsequent segment will actually arrive at distribution queue 630 first. This won't matter since combined index and header file 520 contains the data necessary to index the segments for assembly into the proper sequence.

Those skilled in the art will recognize that using the system and method of the present invention provides distinct advantages over known methods of digital data distribution. For example, the amount of time from time "0" (when data capture commences) until time the final data file is assembled and prepared for distribution, is significantly less than the traditional linear method of data capture, data encoding, data uploading, and data distribution. Additionally, since the parallel processes of capturing, encoding, and uploading of the various segments is not dependent on any reduction in quality, the final data file does not suffer from the quality degradation that is prevalent in most "real time" streaming solutions. The present invention effectively combines the best features of previously known methods in a more effective and efficient model so as to make the content available more quickly while maintaining the desired quality.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), a digital versatile disk (DVD), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the computer system may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

From the foregoing description, it should be appreciated that system and method for capturing and distributing data files disclosed herein presents significant benefits that would be apparent to one skilled in the art. Furthermore, while multiple embodiments have been presented in the foregoing description, it should be appreciated that a vast number of variations in the embodiments exist. Specifically, the illustrative use of the H.264 standard is not limiting and other file types and formats (e.g., ogg and WebM) may be used in the system and methods as described herein. For the H.264 example, the combined header and index segment contains the 'ftyp and 'moov' atoms, whereas the rest of the segments make up the 'mdat' atom.

Similarly, the illustrative use of a network that includes the Internet does not preclude the deployment of the invention over smaller, local networks or intranets and all such network configurations are encompassed within the scope of the invention. Lastly, it should be appreciated that these embodiments are preferred exemplary embodiments only and are not intended to limit the scope, applicability, or configuration of the invention in any way. Rather, the foregoing detailed description provides those skilled in the art with a convenient road map for implementing a preferred exemplary embodiment of the invention, it being understood that various changes may be made in the function and arrangement of elements described in the exemplary preferred embodiment without departing from the spirit and scope of the invention as set forth in the appended claims.

The invention claimed is:

1. A computer system comprising:
at least one processor;
at least one memory coupled to the at least one processor; and
a database residing in the at least one memory; and
a data mechanism residing in the at least one memory, the data mechanism:
    accessing a source data file, the data mechanism being configured to operate in parallel to simultaneously capture, encode, and upload a plurality of data segments file to a destination server to create a content data file on the destination server;
    creating a combined index and header file after all of the plurality of data segments has been captured, the combined index and header file describing the contents of each of the plurality of captured data segments, the combined index and header file containing instructions for properly sequencing each of the plurality of data segments in the content data file;
    transferring the combined index and header file to the destination server;
    assembling and arranging the plurality of data segments in accordance with the instructions in the combined index and header file;
    and appending the combined index and header file to the front of the content data file to form at least one media file suitable for distribution over a network.

2. The computer system of claim 1 wherein the media file is distributed over the Internet.

3. The computer system of claim 1 wherein the source data file comprises a static data file.

4. The computer system of claim 1 wherein the source data file comprises a dynamic data file being captured in real time.

5. The computer system of claim 1 wherein at least a first data segment from the plurality of data segments is being captured while at least a second data segment from the plurality of data segments is being encoded while at least a third data segment from the plurality of data segments is being uploaded to the destination server.

6. The computer system of claim 1 wherein at least two of the data segments from the plurality of data segments are uploaded to the destination server simultaneously.

7. The computer system of claim 1 wherein the at least one media file comprises an H.264 formatted data file.

8. A method comprising the steps of:
 accessing a source data file, the data mechanism being configured to operate in parallel to simultaneously capture, encode, and upload a plurality of data segments to a destination server to create a content data file on the destination server;
 creating a combined index and header file after all of the plurality of data segments has been captured, the combined index and header file describing the contents of each of the plurality of captured data segments, the combined index and header file containing instructions for properly sequencing each of the plurality of data segments in the content data file;
 transferring the combined index and header file to the destination server; and
 assembling and arranging the plurality of data segments in accordance with the instructions in the combined index and header file and appending the combined index and header file to the front of the content data file to form at least one media file suitable for distribution over a network.

9. The method of claim 8 wherein the media file is distributed over the Internet.

10. The method of claim 8 wherein the source data file comprises a static data file.

11. The method of claim 8 wherein the source data file comprises a dynamic data file being captured in real time.

12. The method of claim 8 wherein at least a first data segment from the plurality of data segments is being captured while at least a second data segment from the plurality of data segments is being encoded while at least a third data segment from the plurality of data segments is being uploaded to the destination server.

13. The method of claim 8 wherein at least two of the data segments from the plurality of data segments are uploaded to the destination server simultaneously.

14. The method of claim 8 wherein the at least one media file comprises an H.264 formatted data file.

* * * * *